US012777557B2

(12) United States Patent
Shi et al.

(10) Patent No.: US 12,777,557 B2
(45) Date of Patent: Oct. 27, 2026

(54) METHOD AND APPARATUS FOR RELEASING CONFIGURED GRANT RESOURCES

(71) Applicant: LENOVO (BEIJING) LIMITED, Beijing (CN)

(72) Inventors: Jie Shi, Beijing (CN); Lianhai Wu, Beijing (CN); Haiming Wang, Beijing (CN); Jing Han, Beijing (CN); Ran Yue, Beijing (CN); Jie Hu, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 814 days.

(21) Appl. No.: 18/006,275

(22) PCT Filed: Jul. 21, 2020

(86) PCT No.: PCT/CN2020/103325

§ 371 (c)(1),
(2) Date: Jan. 20, 2023

(87) PCT Pub. No.: WO2022/016387

PCT Pub. Date: Jan. 27, 2022

(65) Prior Publication Data

US 2023/0300944 A1 Sep. 21, 2023

(51) Int. Cl.
*H04W 76/36* (2018.01)
*H04W 72/04* (2023.01)
*H04W 76/38* (2018.01)

(52) U.S. Cl.
CPC ........... *H04W 76/36* (2018.02); *H04W 72/04* (2013.01); *H04W 76/38* (2018.02)

(58) Field of Classification Search
None
See application file for complete search history.

(56) References Cited

U.S. PATENT DOCUMENTS

2009/0185539 A1 7/2009 Ohta et al.
2015/0038143 A1 2/2015 Kilpatrick, II et al.
(Continued)

FOREIGN PATENT DOCUMENTS

CN 110392991 A 10/2019
CN 110536470 A 12/2019
(Continued)

OTHER PUBLICATIONS

European Search Report and Written Opinion dated Mar. 11, 2024 for European patent application No. 20945932.0.
(Continued)

*Primary Examiner* — Robert M Morlan
(74) *Attorney, Agent, or Firm* — AMPACC Law Group, PLLC

(57) ABSTRACT

Embodiments of the present application are directed to a method and apparatus for releasing configured grant (CG) resources. In an embodiment of the present application, the method includes determining whether CG resources in a first cell need to be released; and in response to determining that the CG resources need to be released, transmitting a CG resource releasing report or releasing the CG resources. The CG resource, in some cases, is for the data transmission of UE in idle mode or inactive mode.

19 Claims, 8 Drawing Sheets

(56) References Cited

U.S. PATENT DOCUMENTS

| | | | | |
|---|---|---|---|---|
| 2018/0270719 | A1 | 9/2018 | Chai | |
| 2020/0092842 | A1 | 3/2020 | Kim et al. | |
| 2020/0120622 | A1 | 4/2020 | Yoon | |
| 2021/0076453 | A1* | 3/2021 | Luo | H04W 76/36 |
| 2021/0227575 | A1* | 7/2021 | Ou | H04L 1/1864 |

FOREIGN PATENT DOCUMENTS

| | | | |
|---|---|---|---|
| CN | 110691418 | A | 1/2020 |
| WO | 2020032659 | A1 | 2/2020 |
| WO | 2020033895 | A1 | 2/2020 |
| WO | 2020065620 | A1 | 4/2020 |

OTHER PUBLICATIONS

International Search Report and Written Opinion dated Apr. 22, 2021 for International Application No. PCT /CN2020/103325.
European Search Report and Written Opinion dated Jul. 9, 2024 for European patent application No. 20945932.0.

* cited by examiner

METHOD AND APPARATUS FOR RELEASING CONFIGURED GRANT RESOURCES

CROSS REFERENCE TO RELATED APPLICATIONS

This application is a national phase entry of International Application No. PCT/CN2020/103325, filed on Jul. 21, 2020, entitled METHOD AND APPARATUS FOR RELEASING CONGIGURED GRANT RESOURCES, which is incorporated by reference in its entirety.

TECHNICAL FIELD

Embodiments of the present application generally relate to wireless communication technology, especially to a method and apparatus for releasing configured grant (CG) resources.

BACKGROUND

For a user equipment (UE) in RRC_INACTIVE state (also called an inactive mode UE), pre-configured physical uplink shared channel (PUSCH) resources (configured grant type 1 resources) will be applied for transmitting uplink small data. This configured grant type 1 is configured for a dedicated UE. However, when the UE moves from an old cell (such as, cell A) to a new cell (such as, cell B), the base station (BS) covering the cell A does not know the UE is moving out. The BS covering the cell A may still reserve the configured grant resources for this UE for a while until the value counting the consecutive unused uplink grant resources reaches a predetermined value, which would reduce wireless resource efficiency.

SUMMARY OF THE APPLICATION

Embodiments of the present application provide a method and apparatus for releasing CG resources.

An embodiment of the present application provides a method. The method may include: determining whether configured grant (CG) resources in a first cell need to be released; and in response to determining that the CG resources need to be released, transmitting a CG resource releasing report or releasing the CG resources.

In an embodiment of the present application, the method may further include: determining whether a condition for triggering to transmit the CG resource releasing report is fulfilled; and in response to determining that the condition is fulfilled, transmitting the CG resource releasing report, wherein the condition comprises one of the following or their combination: m is less than or equal to a first value X if a UE is camped to a second cell which is different from the first cell; M−m is larger than or equal to a second value Y if a UE is camped to a second cell which is different from the first cell; time elapsed since a current time point until releasing the CG resources by a base station (BS) is larger than a third value Z; and when a timer expired, wherein the timer starts after a user equipment (UE) is camped in a second cell which is different from the first cell, wherein m is a number of consecutive uplink transmissions which are not performed on the CG resources in the first cell, M is a maximum number of consecutive uplink transmissions which are not performed on the CG resources for determining to release the CG resources by the BS, and X, Y and Z are integers. For example, the UE transmits the CG resource releasing report in the case that the condition is that m is less than or equal to the first value X and the timer that starts after the UE is camped in the second cell or UE is not camped in the first cell is expired. In another example, the UE transmits the CG resource releasing report in the case that the condition is that M−m is larger than or equal to the second value Y and the timer that starts after the UE is camped in the second cell or the UE is not camped in the first cell is expired.

In an embodiment of the present application, the method may further include: receiving indication information for indicating whether a user equipment (UE) is enabled to transmit the CG resource releasing report. The indication information is received via a radio resource control (RRC) message, media access control (MAC) control element (CE) or a system information block (SIB) message. The indication information indicates to enable or disable CG resource releasing associated with specific CG index, specific band width part (BWP), specific cell, or specific UE.

In an embodiment of the present application, the method may include: receiving indication information for indicating whether a user equipment (UE) is enabled to transmit the CG resource releasing report based on the condition.

In an embodiment of the present application, for a UE in inactive mode, in the case that the UE moves from the first cell to a second cell which is different from the first cell, the CG resource releasing report comprises at least one of: ID information of the UE; and the CG resource information in the first cell. The CG resource releasing report is transmitted in a random access procedure with indication information for indicating the CG resources releasing. The CG resource releasing report is transmitted by a Msg.A based on two-step random access channel (RACH) procedure, or a Msg.3 or a Msg. 5 in a random access procedure. The indication information for indicating the CG resources releasing is transmitted via a radio resource control (RRC) signaling or via a media access control (MAC) control element (CE), or physical lay signaling.

In an embodiment of the present application, for a UE in inactive mode, in the case that the UE moves from the first cell to a second cell which is different from the first cell, the CG resource releasing report comprising at least one of ID information of the UE, the CG resource in a first cell releasing indication or the CG resource information in the first cell is transmitted when the UE is in connected mode. The CG resource information in the first cell indicates which CG resources can be released or which CG resources can be reserved.

In an embodiment of the present application, for a UE in idle mode, in the case that the UE moves from the first cell to a second cell which is different from the first cell, the CG resource releasing report comprises at least one of: ID information of the UE in the first cell and ID information of the first cell; and the CG resource information in the first cell. The CG resource releasing report is transmitted in a random access procedure with indication information for indicating the CG resources releasing. The CG resource releasing report is transmitted by a Msg.A based on two-step RACH procedure, or a Msg.3 or a Msg. 5 in the random access procedure. The indication information for indicating the CG resources releasing is transmitted via a radio resource control (RRC) signaling, via a media access control (MAC) control element (CE), or physical layer signaling.

In an embodiment of the present application, for a UE in idle mode, in the case that the UE moves from the first cell to a second cell which is different from the first cell, the CG resource releasing report comprising at least one of ID information of the UE, ID information of the first cell, the CG resource in the first cell releasing indication or CG resource information in the first cell is transmitted when the UE is in connected mode. The CG resource information in the first cell indicates which CG resources can be released or which CG resources can be reserved.

In an embodiment of the present application, transmitting the CG resource releasing report to a BS covering the first cell. The CG resource releasing report comprises the CG resource information in the first cell for data transmission for UE in idle mode or in inactive mode. The CG resource information in the first cell indicates which CG resources can be released or which CG resources can be reserved.

Another embodiment of the present application provides a method. The method may include: receiving parameters including a threshold of synchronization signal (SSB) blocks and physical broadcast channel (PBCH) blocks and a number of SSB to be averaged for consolidation and selection of channel quality measurement and/or receiving parameters including a threshold of channel state information-reference signal (CSI-RS) resource and a number of CSI-RS resource to be averaged for consolidation and selection of channel quality measurement; and performing at least one of reference signal receiving power (RSRP) measurement, a reference signal receiving quality (RSRQ) measurement or signal to interference plus noise ratio (SINR) measurement based on the received parameters.

In an embodiment of the present application, the method may further include: evaluating RSRP changing based on the RSRP measurement; and determining whether timing advance (TA) is invalid based on the evaluated RSRP changing. The parameters are configured in information element (IE) field RSRP changing for TA validation. In another example, the parameters are configured in a RRC connection release or suspend message for data transmission over configured grant (CG) resources.

In an embodiment of the present application, the method may further include: receiving a threshold; and applying configured grant (CG) resources for data transmission in the case that measurement value of RSRP, RSRQ, or SINR is equal to or larger than the threshold.

Another embodiment of the present application provides a method. The method may include: transmitting information to a user equipment (UE), wherein the information is used for determining whether configured grant (CG) resources in a first cell needs to be released; and releasing the CG resources in the first cell.

In an embodiment of the present application, the information comprises a condition for triggering the UE to transmit a CG resource releasing report. The condition comprises one of the following or their combination: m is less than or equal to a first value X if a UE is camped to a second cell which is different from the first cell; M−m is larger than or equal to a second value Y if a UE is camped to a second cell which is different from the first cell; time elapsed since a current time point until releasing the CG resources by a base station (BS) is larger than a third value Z; and when a timer expired, wherein the timer starts after a UE is camped in a second cell which is different from the first cell, wherein m is a number of consecutive uplink transmissions which are not performed on the CG resources in the first cell, M is a maximum number of consecutive uplink transmissions which are not performed on the CG resources for determining to release the CG resources by the BS, and X, Y and Z are integers.

In an embodiment of the present application, for example, the condition is that m is less than or equal to the first value X and the timer that starts after the UE is camped in the second cell or the UE is not camped in the first cell is expired. In another example, the condition is that the condition is that M−m is larger than or equal to the second value Y and the timer that starts after the UE is camped in the second cell or the UE is not camped in the first cell is expired.

In an embodiment of the present application, the method may further include: transmitting indication information for indicating whether the UE is enabled to transmit the CG resource releasing report. The indication information is transmitted via a radio resource control (RRC) message, media access control (MAC) control element (CE) or a system information block (SIB) message. The indication information indicates to enable or disable CG resource releasing associated with specific CG index, specific band width part (BWP), specific cell, or specific UE.

In an embodiment of the present application, for the UE in inactive mode, in the case that the UE moves from the first cell to a second cell which is different from the first cell, the method further comprises receiving from a base station (BS) covering the second cell at least one of: ID information of the UE; and the CG resource information in the first cell.

In an embodiment of the present application, for the UE in idle mode, in the case that the UE moves from the first cell to a second cell which is different from the first cell, the method further comprises receiving from a base station (BS) covering the second cell at least one of: ID information of the UE in the first cell and ID information of the first cell; and the CG resource information in the first cell, In an embodiment of the present application, the method further comprises receiving a CG resource releasing report from the UE. The CG resource releasing report comprises the CG resource information in the first cell for data transmission for a UE in idle mode or in inactive mode.

In an embodiment of the present application, the CG resource information in the first cell indicates which CG resources can be released or which CG resources can be reserved.

Another embodiment of the present application provides a method. The method may include: receiving a configured grant (CG) resource releasing report from a user equipment (UE); and transmitting information for releasing the CG resources of the UE in a first cell on an interface Xn to a base station (BS) covering the first cell.

In an embodiment of the present application, the CG resource releasing report is received in a random access procedure with indication information for indicating the CG resources releasing. The CG resource releasing report is received by a Msg.A based on two-step random access channel (RACH) procedure, or a Msg.3 or a Msg. 5 in a random access procedure. The indication information for indicating the CG resources releasing is received via a radio resource control (RRC) signaling or via a media access control (MAC) control element (CE), or physical layer signaling.

In an embodiment of the present application, for the UE in inactive mode, in the case that the UE moves from the first cell to a second cell which is different from the first cell, the CG resource releasing report comprises at least one of: ID information of the UE; and the CG resource information in the first cell. The method may further include: transmitting the at least one of ID information of the UE and the CG resource information in the first cell to the BS covering the first cell.

In an embodiment of the present application, for the UE in idle mode, in the case that the UE moves from the first cell to a second cell which is different from the first cell, the CG resource releasing report comprises at least one of: ID information of the UE in the first cell and ID information of the first cell; and the CG resource information in the first cell. The method may further include: transmitting the at least one of ID information of the UE in the first cell and ID information of the first cell and the CG resource information in the first cell to the BS covering the first cell.

In an embodiment of the present application, for the UE in inactive mode, in the case that the UE moves from the first cell to a second cell which is different from the first cell, the CG resource releasing report comprising at least one of ID information of the UE, the CG resource in a first cell releasing indication or the CG resource information in the first cell is received when the UE is in connected mode.

In an embodiment of the present application, for the UE in idle mode, in the case that the UE moves from the first cell to a second cell which is different from the first cell, the CG resource releasing report comprising at least one of ID information of the UE, ID information of the first cell, the CG resource in the first cell releasing indication or CG resource information in the first cell is received when the UE is in connected mode.

The CG resource information in the first cell indicates which CG resources can be released or which CG resources can be reserved.

Another embodiment of the present application provides a method. The method may include: transmitting parameters including a threshold of synchronization signal blocks (SSBs) and physical broadcast channel (PBCH) blocks and a number of SSB to be averaged for consolidation and selection of channel quality measurement and/or transmitting parameters including a threshold of channel state information-reference signal (CSI-RS) resource and a number of CSI-RS resource to be averaged for consolidation and selection of channel quality measurement, wherein the parameters are used for performing at least one of reference signal receiving power (RSRP) measurement, a reference signal receiving quality (RSRQ) measurement or signal to interference plus noise ratio (SINR) measurement by the UE The parameters are configured in information element (IE) field RSRP changing for timing advance (TA) validation. In another example, the parameters are configured in a RRC connection release or suspend message for data transmission over configured grant (CG) resources.

In an embodiment of the present application, the method may further include: transmitting a threshold associated with measurement value of RSRP, RSRQ or SINR, wherein configured grant (CG) resources for data transmission is applied in the case that the measurement value of the RSRP, RSRQ, or SINR is equal to or larger than the threshold.

Another embodiment of the present application provides an apparatus. The apparatus may include at least one non-transitory computer-readable medium having computer executable instructions stored therein; at least one receiver; at least one transmitter; and at least one processor coupled to the at least one non-transitory computer-readable medium, the at least one receiver and the at least one transmitter. The computer executable instructions are programmed to implement the above method with the at least one receiver, the at least one transmitter and the at least one processor.

The embodiments of the present application can make the old cell release the CG resources more efficiently.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of preferred embodiments of the present application and is not intended to represent the only form in which the present application may be practiced. It should be understood that the same or equivalent functions may be accomplished by different embodiments that are intended to be encompassed within the spirit and scope of the present application.

Reference will now be made in detail to some embodiments of the present application, examples of which are illustrated in the accompanying drawings.

Figure 1:
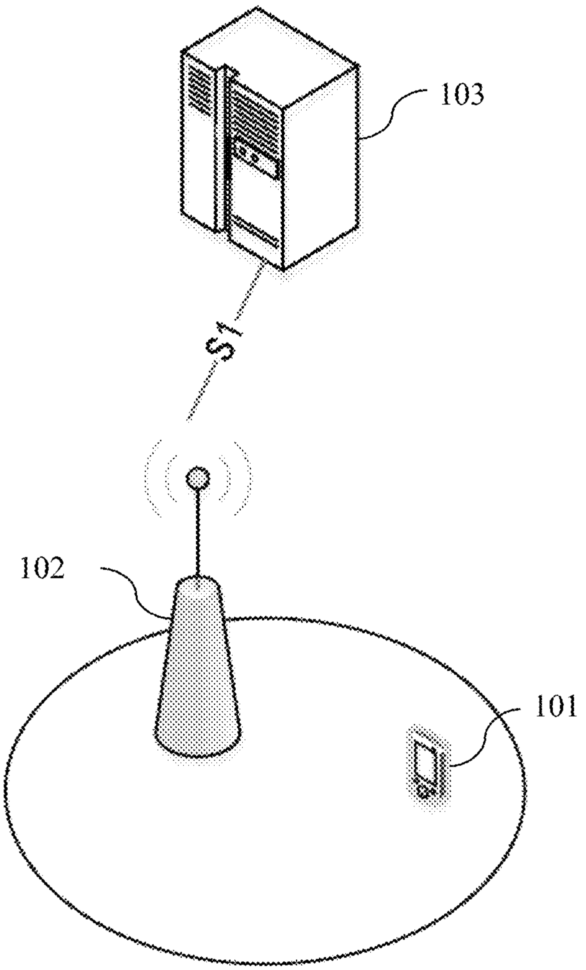
FIG. 1 illustrates a wireless communication system according to some embodiments of the present application.

FIG. 1 illustrates a wireless communication system according to some embodiments of the present application.

As shown in FIG. 1, the wireless communication system can include at least one BS, at least one UE, and a CN node. Although a specific number of BSs and UEs, e.g., a BS (e.g., BS 102) and a UE (UE 101) are depicted in FIG. 1, one skilled in the art will recognize that any number of the BSs and UEs may be included in the wireless communication system.

As shown in FIG. 1, the BS 102 may be distributed over a geographic region and may communicate with the CN node 103 via an interface S1. In an example, the UE 101 can be a LTE UE, the BS 102 can be an eNB, and the CN node 103 can be a mobility management entity (MME) or a serving gateway (S-GW). In an example, the UE 101 is in IDLE mode. When performing small data transmission, the UE 101 connects to the BS 102, and the BS 102 transmits the small data to the CN node 103 via the interface S1.

Figure 2:
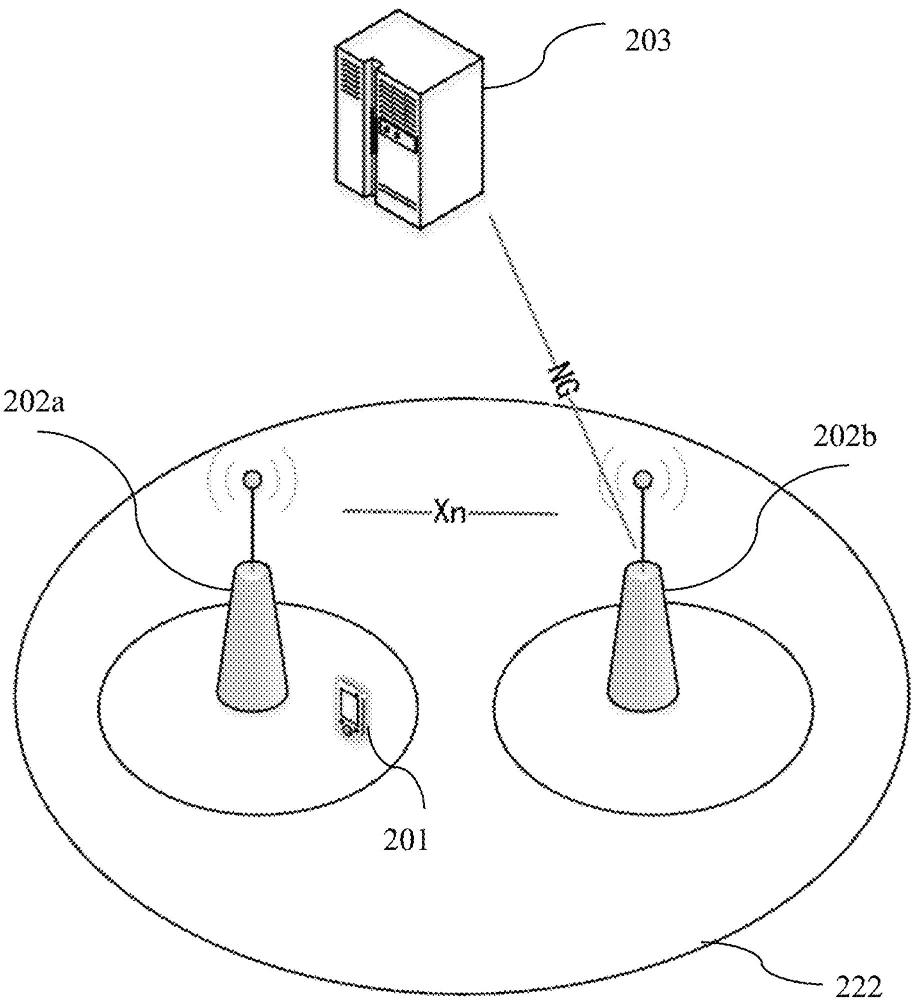
FIG. 2 illustrates another wireless communication system according to some embodiments of the present application.

FIG. 2 illustrates another wireless communication system according to some embodiments of the present application.

As shown in FIG. 2, the wireless communication system can include at least one BS, at least one UE, and a CN node. Although a specific number of BSs and UEs, e.g., two BSs (e.g., BS 202*a* and BS 202*b*) and a UE (UE 201) are depicted in FIG. 2, one skilled in the art will recognize that any number of the BSs and UEs may be included in the wireless communication system.

The BS 202*a* and the BS 202*b* may be distributed over a geographic region, and they may communicate with each other via an interface Xn. The BS 202*a* and the BS 202*b* may communicate with a CN node 203 via an interface NG. In an embodiment of the present application, the CN node 203 may include a mobility management function (AMF) or a user plane function (UPF). In some embodiments of the present application, the BS 202*a* or the BS 202*b* may also be referred to as an access point, an access terminal, a base, a base unit, a macro cell, a Node-B, an evolved Node B (eNB), a gNB, a Home Node-B, a relay node, or a device, or described using other terminology used in the art. The BS 202*a* or the BS 202*b* is generally part of a radio access network that may include one or more controllers communicably coupled to one or more corresponding BS(s).

The UE 201 may be a computing device, such as a desktop computer, a laptop computer, a personal digital assistant (PDA), a tablet computer, a smart television (e.g., a television connected to the Internet), a set-top box, a game console, a security system (including security cameras), a vehicle on-board computer, a network device (e.g., router, switch, and modem), or the like. According to an embodiment of the present application, the UE 201 may be a portable wireless communication device, a smart phone, a cellular telephone, a flip phone, a device having a subscriber identity module, a personal computer, a selective call receiver, or any other device that is capable of sending and receiving communication signals on a wireless network. In some embodiments of the present application, the UE 201 may be a wearable device, such as a smart watch, a fitness band, an optical head-mounted display, or the like. Moreover, the UE 201 may be referred to as a subscriber unit, a mobile, a mobile station, a user, a terminal, a mobile terminal, a wireless terminal, a fixed terminal, a subscriber station, a user terminal, or a device, or described using other terminology used in the art.

In an example, the UE 201 is in a RRC_INACTIVE state (or inactive mode). The BS 202*a* and the BS 202*b* are gNB. RRC_INACTIVE state is a state where a UE remains in connection management (CM)-CONNECTED and can move within an area configured by next generation-radio access network (NG-RAN) (that is, RAN notification area (RNA)) without notifying NG-RAN. As shown in FIG. 2, the UE 201 can move with the RNA 222. The BS 202*b* is the last serving BS of UE 201, and the UE 201 is currently in the cell covered by the BS 202*a*. For the UE 201 in RRC_INACTIVE, the BS 202*b* keeps the context of the UE 201 and the associated NG connection with the CN node 203 (such as, the serving AMF and UPF). The UE 201 in inactive mode may transmit uplink data. For example, the UE 201 may perform small data transmission. In an example, when performing the small data transmission, the BS 202*a* may transmit the data from the UE 201 to the BS 202*b* via the interface Xn, and then the BS 202*b* transmits the data to the CN node 203. In another example, when performing the small data transmission, the BS 202*a* knows that there is data from the UE 201 to be transmitted, the BS 202*a* first obtains the context of the UE 201 from the BS 202*b* and then transmits the data from the UE 201 to the CN node 203.

For an inactive mode UE, configured grant type 1 resources will be applied for transmitting uplink small data. This configured grant type 1 is configured for a dedicated UE. However, when the UE moves from an old cell (such as, cell A) to a new cell (such as, cell B), the BS covering the cell A does not know the UE is moving out. The BS covering the cell A may still reserve the configured grant resources for this UE for a while until the value counting the consecutive unused uplink grant resources reaches a predetermined value. For example, the m value counting the consecutive unused uplink grant resources is increased to M, which would reduce the wireless resource efficiency. Hence, the configured grant resources in cell A need to be released early when UE moves to new cell.

Therefore, it is desirable to make the BS covering the last cell (such as cell A) of the UE release the configured grant (CG) resources more efficiently.

Figure 3:
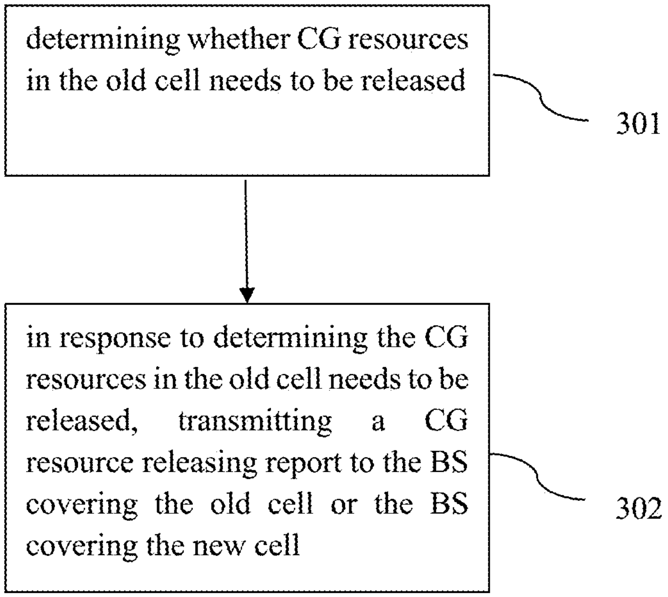
FIG. 3 illustrates a flow chart of a method for releasing CG resources according to some embodiments of the present application.

FIG. 3 illustrates a flow chart of a method for releasing CG resources according to some embodiments of the present application. The method in FIG. 3 may be performed by a UE (such as, the UE 101 in FIG. 1 or the UE 201 in FIG. 2).

As shown in FIG. 3, in step 301, a UE (such as, the UE 101 in FIG. 1 or the UE 201 in FIG. 2) may determine whether configured grant (CG) resources in the old cell (such as cell A) needs to be released. The old cell here means the last cell which the UE was camped on or served by.

In step 302, in response to determining the CG resources in the old cell needs to be released, the UE may transmit a CG resource releasing report to the BS covering the old cell or the BS covering the new cell according to different cases or release the CG resources. The above procedure will be described in conjunction with the following embodiments of the present application.

Figure 4:
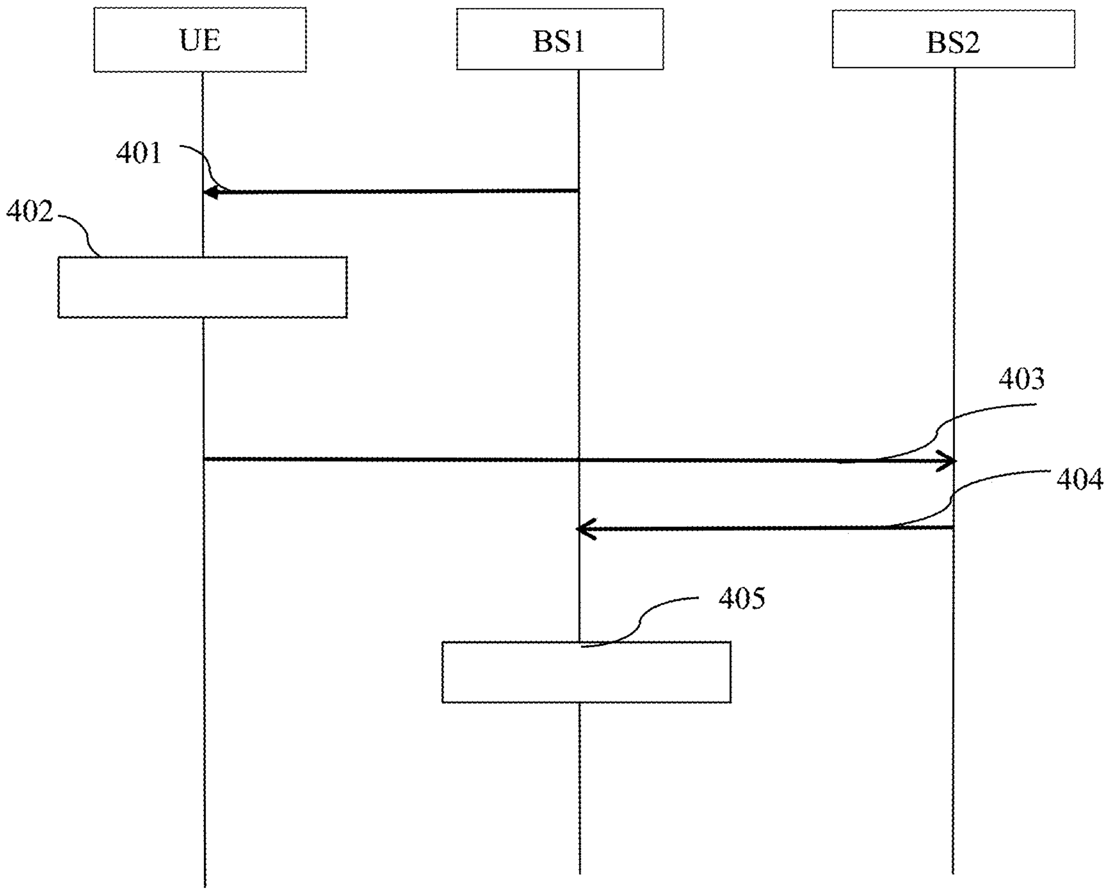
FIG. 4 illustrates a flow chart of a method for releasing CG resources according to an embodiment of the present application.

FIG. 4 illustrates a flow chart of a method for releasing CG resources according to an embodiment of the present application.

In this embodiment, a UE (such as, the UE 101 in FIG. 1 or the UE 201 in FIG. 2) moves from the old cell (such as cell A) to a new cell (such as, cell B). As shown in FIG. 4, BS1 is the BS covering the old cell (cell A), and BS2 is the BS covering the new cell (cell B). In this embodiment, the BS1 covering cell A and the BS2 covering cell B are different BS. FIG. 4 illustrates the interaction among the UE, BS1 and BS2.

In step 401, the BS (such as the BS1) may transmit information to the UE, and the information is used for determining whether CG resources in cell A need to be released. For example, the information may indicate a condition for triggering to transmit a CG resource releasing report.

The condition may include one of the following options or their combination:

Option 1: m is less than or equal to X if a UE is not camped on the old cell (such as the cell A) or if the UE is camped to another cell (such as, the cell B). For example, $X<M$. m is the number of consecutive uplink transmissions which are not performed on the CG resources in the old cell; M is the maximum number of consecutive uplink transmissions which are not performed on the CG resources for determining to release the CG resources by the BS. In another example, m is the number of consecutive downlink receptions which are not performed on the CG resources in the old cell; M is the maximum number of consecutive downlink receptions which are not performed on the CG resources for determining to release the CG resources by the BS. X is a configured value and X may be an integer equal to or greater than 1. Condition 1 means that the number of unused CG resources is large and will be wasted until the BS1 releases the CG configuration based on the condition that $m=M$.

The consecutive uplink transmissions which are not performed on the CG resources may include the following procedure. If a transmission using the CG resource is not initiated or if a CG failure indication is received from lower layers, it may consider the CG resource (CG occasion) as being skipped. If M number of consecutive CG resources (CG occasions) have been skipped, it will release CG resource. The UE will also indicate to lower layers that CG resource TimeAlignmentTimer is released if TimeAlignmentTimer is configured. The CG failure indication means that the UE failed to transmission the data over the CG resource. For example, the UE does not receive any feedback from the network. Hence, the consecutive uplink transmissions which are not performed on the CG resources could mean that the consecutive uplink transmissions are skipped.

Option 2: M−m is larger than or equal to Y if a UE is not camped on the old cell (such as the cell A) or if the UE is camped to another cell (such as, the cell B). Y is a configured value, and Y may be an integer equal to or greater than 1. M−m means the difference between M and m. Option 2 is a variation of Option 1.

Option 3: time elapsed since a current time point until releasing the CG resources by a base station (BS) is larger than Z. Z is a configured value, and Z may be an integer equal to or greater than 1 second. In an example, the current time point is the time when the UE reselects to a new cell. In another example, the current time point is the time when the UE has been camped on a new cell for a time duration.

Option 4: when a configured timer expired, the timer starts after a UE is camped on a new cell, and the timer will be stopped if the UE moves to the old cell. The timer can be configured to run for a period for guaranteeing no ping-pang case happening. In another example, the timer continues to running if the UE is camped on another new cell C, a CG resource releasing report will be sent to cell C if the timer is expired when the UE is camped on cell C.

It should be understood the above options can be used independently or used in combination. For example, Option 1 or Option 2 can be used in combination with Option 3, or Option 1 or Option 2 can be used in combination with Option 4, or Option 1 or Option 2 could be used in combination with Option 3 and Option 4 together.

In an example, the UE transmits the CG resource releasing report to the network in the case that the condition is that m is less than or equal to X and the timer that starts after the UE is camped in another cell or the UE is not camped in the old cell is expired. In another example, the UE transmits the CG resource releasing report to the network in the case that the condition is that M−m is larger than or equal to Y and the timer that starts after the UE is camped in another cell or the UE is not camped in the old cell is expired.

It should be understood the information including at least one of m, M, time, timer could be configured by network to UE.

In step 402, the UE may determine whether the condition is fulfilled.

In step 403, when determining the condition is fulfilled, the UE transmits the CG resource releasing report to BS2 covering cell B where the UE is currently camped on. Possibly, the UE may transmit the CG resource releasing report to a BS covering cell C where the UE is currently camped on.

In step 404, the BS2 may transmit an indication for releasing the CG resources in cell A of the UE to BS1.

According to the indication from the BS2, in step 405, the BS1 releases the CG resources pre-configured for the UE according to the indication from the BS2.

In another example, the BS1 may transmit indication information for indicating a UE is enabled or disabled to transmit the CG resource releasing report (for example, in step 401) with or without the above condition. For example, BS1 may transmit the indication information via a radio resource control (RRC) message, media access control (MAC) control element (CE) or a system information block (SIB) message. Therefore, the UE may firstly determine whether it needs to transmit the CG resource releasing report based on the indication information before judging the above condition.

In an example, if a BS (such as BS1) evaluates that the CG type 1 resource of the UE is few or overhead, it may enable the UE to transmit the CG resource releasing report based on an implicit or explicit way. For example, for an implicit way, the BS may directly transmit an indication for enabling the transmission of the CG resource releasing report to the UE. For an implicit way, the BS may configure the above condition to the UE.

Otherwise, if the BS may configure the UE not to transmit the report based on an implicit or explicit way. For example, for an implicit way, the BS may directly transmit an indication for disabling the transmission of the CG resource releasing report to the UE, this means UE is not needed to perform the CG resource release procedure. For an implicit way, the BS will not configure the above condition to the UE.

In an embodiment, the indication information may further indicate to enable or disable CG resource releasing associated with specific CG index, specific band width part (BWP), specific cell, or specific UE. For example, the UE may transmit the CG resource releasing report including BWP specific CG resource based on the indication information.

In another embodiment of the present application, the method may include: receiving indication information for indicating whether a UE is enabled to transmit the CG resource releasing report based on the above condition. The indication information is received via a RRC message, MAC CE or a SIB message. The indication information indicates to enable or disable CG resource releasing associated with specific CG index, specific band width part (BWP), specific cell, or specific UE. For example, the UE will transmit the CG resource releasing report including BWP specific CG resource if the condition is fulfilled. The condition for example, could be m is less than or equal to X over BWP specific CG resource, the m will be increased if any CG resource is not performed or skipped. For another example, m is less than or equal to X over each CG resource in the specific BWP, when the m will be increased for a dedicated CG resource which belongs to a CG resource index.

Figure 5:
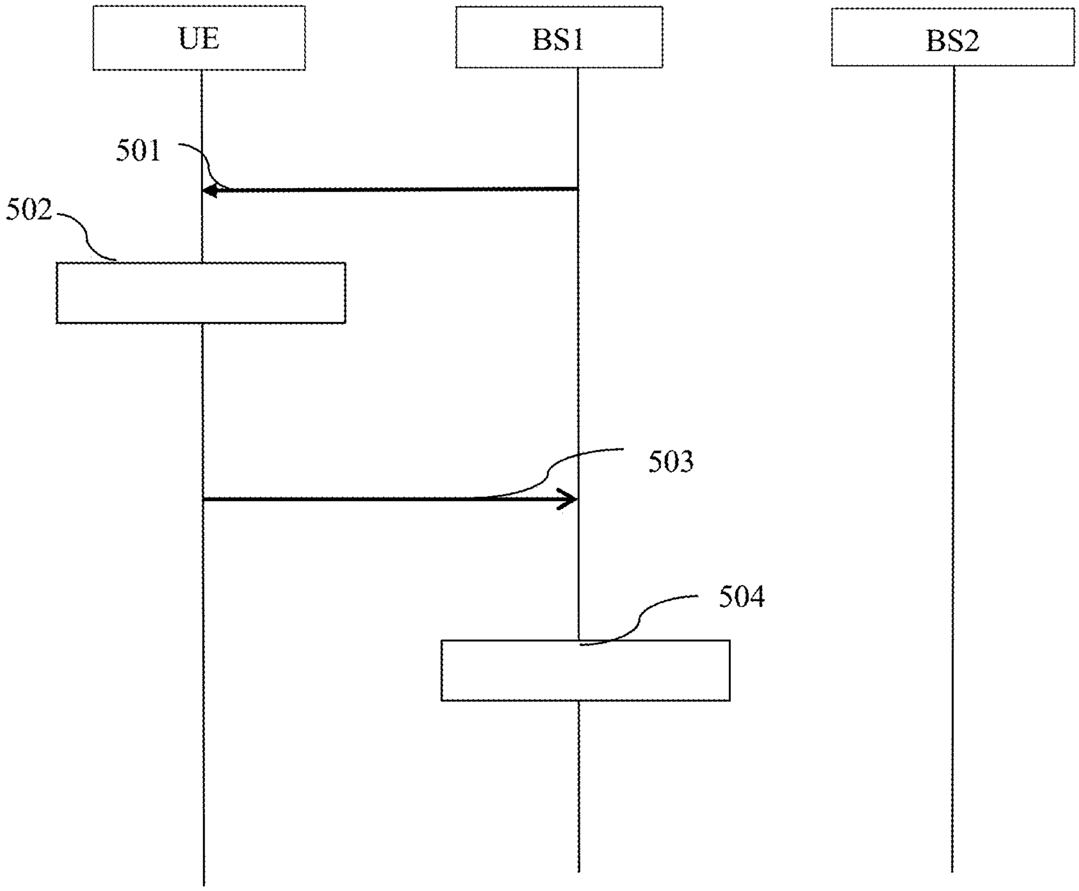
FIG. 5 illustrates a flow chart of another method for releasing CG resources according to an embodiment of the present application.

FIG. 5 illustrates a flow chart of another method for releasing CG resources according to an embodiment of the present application.

In this embodiment, a UE (such as, the UE 101 in FIG. 1 or the UE 201 in FIG. 2), which is currently camped on the old cell (such as cell A), decides to camp on a new cell (such as, cell B) after a cell reselection procedure. As shown in FIG. 5, the operations of steps 501 and 502 are similar to those of 401 and 402, which will not be described in detail. In this embodiment, the above Options 1 and 2 can be applied.

After determining the condition (such as, Option 1 or Option 2) is fulfilled, in step 503, the UE transmits the CG resource releasing report to the BS1 covering cell A which the UE is currently camped on.

And then in 504, the BS1 releases the CG resource according to the received CG resource releasing report from the UE.

In this embodiment, the BS1 may also transmit indication information for indicating a UE is enabled or disabled to transmit the CG resource releasing report (for example, in step 501) with or without the above condition. The operation relating to the indication information is similar to the above operation in FIG. 4, which will be not described in detail for avoiding repetitive.

Although there are two BSs (BS1 and BS2) shown in FIG. 4 and FIG. 5, in some embodiments, cell A and cell B may be covered by a same BS. In this case, step 404 in FIG. 4 is not performed. That is, the BS covering both cell A and cell B or covering both cell A and cell C may release the CG resources for the UE according to the received CG resource report from the UE.

According to some embodiments of the present application, the UE may go through multiple cells after leaving cell A, the cell B could be considered as the last cell that could be satisfied to the condition.

According to some embodiments of the present application, what assistant information should be reported in the CG resource releasing report to the BS for releasing resource and in which step to report the assistant information need to be considered. The operations relating to the assistant information will also be described in detail in conjunction with FIG. 4 and FIG. 5.

In FIG. 4, a UE (such as, the UE 101 in FIG. 1 or the UE 201 in FIG. 2) moves from the old cell (such as cell A) to a new cell (such as, cell B). BS1 is the BS covering the old cell (cell A), and BS2 is the BS covering the new cell (cell B). For the UE in cell B, the UE may report at least one of its UE ID information and CG grant resource information to the BS2 covering cell B, such that the BS2 may notify BS1 covering cell A of the releasing of the CG resources for the UE. The operations in steps 401 and 402 in this embodiment are the same as those as described before, which will not be described in detail for avoiding repetitive.

In an embodiment, for the UE in inactive mode, the UE may report its ID information of the UE and/or the CG resource information in the old cell, for example, in the CG resource releasing report in step 403 of FIG. 4.

In an example, the ID information of the UE is inactive-radio network temporary identifier (I-RNTI) information of the UE.

In an example, the CG resource information in the old cell may indicate which CG resources can be released or which CG resources can be reserved. For example, the CG resources to be released or reserved may be associated with specific CG index (or CG ID), specific band width part (BWP), specific cell (cell ID), or specific UE (UE ID in the old cell). For example, the CG resource associated with an index (such as, index 2) will be released or reserved; for another example, the whole CG resource in BWP level will be released or reserved; for yet another example, the whole CG resource in cell level will be released or reserved; for yet another example, the whole CG resource in UE will be released or reserved.

In an example, the UE may transmit the CG resource releasing report including its ID information of the UE and/or the CG resource information in the old cell in a random access procedure with indication information for indicating the CG resources releasing. The indication information may be a cause value for indicating the CG resources releasing, or be a MO-signaling to neighbor cell or eNB.

For example, the CG resource releasing report is transmitted by a Msg.A based on two-step random access channel (RACH) procedure, or a Msg.3 or a Msg. 5 in a random access procedure. In an example, the indication information may be transmitted via a radio resource control (RRC) signaling, via a media access control (MAC) control element (CE), or physical layer signaling.

And then, after receiving the CG resource releasing report including the ID information of the UE and/or the CG resource information in the old cell in step 403, in step 404, BS2 transmits the ID information of the UE and/or the CG resource information in the old cell (cell A) to the BS1 covering cell A. For example, the BS2 may transmit the above ID information of the UE and/or CG resource information to BS1 via an interface Xn. Therefore, in step 405, BS1 may release the corresponding CG resource in cell A for the UE according to the ID information of the UE and the CG resource information.

In another embodiment, for the UE in inactive mode, in the case that the UE moves from the cell A to cell B, the CG resource releasing report including at least one of ID information of the UE, the CG resource in a first cell releasing indication or the CG resource information in cell A is transmitted when the UE is in connected mode. Similarly, the CG resource information in the cell A indicates which CG resources can be released or which CG resources can be reserved. For example, the CG resources to be released or reserved may be associated with specific CG index (or CG ID), specific band width part (BWP), specific cell (cell ID), or specific UE (UE ID in the old cell). For example, the CG resource associated with an index (such as, index 2) will be released or reserved; for another example, the whole CG resource in BWP level will be released or reserved; for yet another example, the whole CG resource in cell level will be released or reserved; for yet another example, the whole CG resource in UE will be released or reserved.

In yet another embodiment, for the UE in idle mode, the UE may report its ID information of the UE in last or old cell (cell A) and the ID information of the last cell (cell A) and/or the CG resource information in the last cell (cell A), for example, in the CG resource releasing report in step 403 of FIG. 4. Similarly, the CG resource information in cell A indicates which CG resources can be released or which CG resources can be reserved.

In an example, the UE may transmit the CG resource releasing report including its ID information of the UE in last cell and the ID information of the last cell and/or the CG resource information in the last cell in a random access procedure with indication information for indicating the CG resources releasing. The indication information may be a cause value for indicating the CG resources releasing.

Similarly to the above embodiment, for example, the CG resource releasing report is transmitted by a Msg.A based on two-step random access channel (RACH) procedure, or a Msg.3 or a Msg. 5 in a random access procedure, or in UE connected mode. The indication information may be transmitted via a radio resource control (RRC) signaling or via a media access control (MAC) control element (CE), or physical layer signaling.

In another embodiment, for a UE in idle mode, in the case that the UE moves from the cell A to cell B, the CG resource releasing report comprising at least one of ID information of the UE, ID information of the first cell, the CG resource in the first cell releasing indication or CG resource information in the cell A is transmitted when the UE is in connected mode. The UE will transmits the CG resource releasing report to the BS2 covering the cell B. The CG resource information in the cell A indicates which CG resources can be released or which CG resources can be reserved.

And then, after receiving the CG resource releasing report including its ID information of the UE in last cell (cell A) and the ID information of the last cell and/or the CG resource information in the last cell in step 403, in step 404, according to the ID information of the last cell, BS2 transmits the ID information of the UE in cell A and/or the CG resource information in cell A to BS1 covering cell A. For example, the BS2 may transmit at least one of the ID information of the UE in cell A, the ID information of cell A or CG resource information to BS1 via an interface Xn. Therefore, in step 405, the BS1 may release the corresponding CG resource in cell A for the UE according to the ID information of the UE in cell A and/or CG resource information.

In yet another embodiment, in FIG. 5, a UE (such as, the UE 101 in FIG. 1 or the UE 201 in FIG. 2), which is currently camped on the old cell (such as cell A), decides to camp on a new cell (such as, cell B) after a cell reselection procedure. The operations in steps 501 and 502 in this embodiment are the same as those as described before, which will not be described in detail for avoiding repetitive.

In this embodiment, the UE may transmit the CG resource releasing report including the CG resource information in cell A for data transmission for the UE in idle mode or in inactive mode to BS1 covering cell A in step 503 of FIG. 5.

Similarly to the above embodiment, for example, the CG resource releasing report is transmitted by a Msg.A based on two-step RACH procedure, or a Msg.3 or a Msg. 5 in a random access procedure, or in UE connected mode.

Similarly to the above embodiment, for example, the CG resource information in the old cell may indicate which CG resources can be released or which CG resources can be reserved. For example, the CG resources to be released or reserved may be associated with specific CG index (or CG ID), specific band width part (BWP), specific cell (cell ID), or specific UE (UE ID in the old cell). For example, the CG resource associated with an index (such as, index 2) will be released or reserved; for another example, the whole CG resource in BWP level will be released or reserved; for yet another example, the whole CG resource in cell level will be released or reserved; for yet another example, the whole CG resource in UE will be released or reserved. According to some embodiments of the present application, the CG index or CG resource information could be a CG ID information with 20 bit to identify the UE CG resource in cell level.

And then in 504, the BS1 releases the CG resource according to the received CG resource releasing report from the UE.

In some embodiment of the present application, the CG resource releasing report could be explicitly or implicitly transmitted in the RRC message. For example, UE could include CG resource information in cell A in the RRC connection resume/establishment/re-establishement/set up/reconfiguration complete message, then gNB will know that the CG resource in cellA should be released based on the UE's ID in RNA, or the UE ID in cell A and the ID of cell A, then gNB will transfer the related information over Xn interface.

According to some embodiments of the present application, how to keep the good channel quality for a UE in inactive mode with small data transmission needs to be considered.

According to some embodiments of the present application, the separate parameters including a threshold of synchronization signal and physical broadcast channel (PBCH) block (SSB) and a number of SSB to be averaged for consolidation and selection of channel quality measurement and/or parameters including a threshold of channel state information-reference signal (CSI-RS) resource and a number of CSI-RS resource to be averaged for consolidation and selection of channel quality measurement will be configured by a BS to UE related to at least one of reference signal receiving power (RSRP) measurement, a reference signal receiving quality (RSRQ) measurement or signal to interference plus noise ratio (SINR) computing for time advance (TA) invalid in data transmission case (such as, small data transmission case). In an embodiment, the threshold of SSB parameter may be higher than the one in system information block (SIB) for cell reselection.

Figure 6:
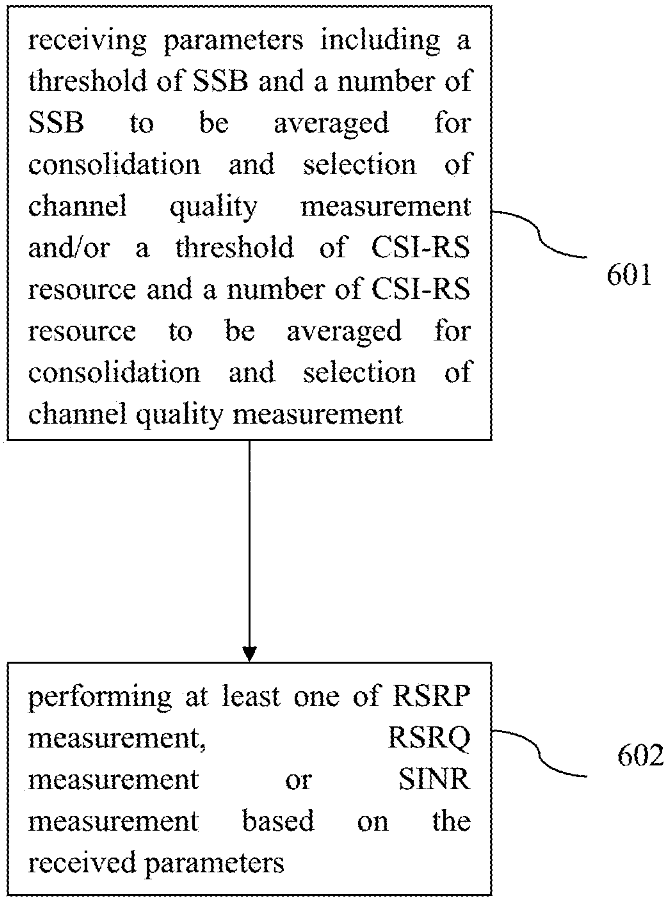
FIG. 6 illustrates a flow chart of a method for computing RSRP according to some embodiments of the present application.

FIG. 6 illustrates a flow chart of a method for computing RSRP, RSRQ, or SINR according to some embodiments of the present application. The method in FIG. 6 may be performed by a UE (such as, the UE 101 in FIG. 1 or the UE 201 in FIG. 2).

As shown in FIG. 6, in step 601, the UE receives parameters including a threshold of synchronization signal and physical broadcast channel (PBCH) block (SSB) and a number of SSB to be averaged for consolidation and selection of channel quality measurement and/or parameters including a threshold of CSI-RS resource and a number of CSI-RS resource to be averaged for consolidation and selection of channel quality measurement from a BS (such as the BS 102 in FIG. 1 or the BS 202*a* in FIG. 2). The parameters could be used as the beam consolidation thresholds and the maximum number of beams to be averaged. For example, the parameters including absThreshSS-Blocks-Consolidation and nrofSS-BlocksToAverage for small data transmission may be configured to the UE in the below two fields. The RSRP measurement is a linear average of the power values of up to maximum configured number of highest SSB measurement quality values above a configured threshold.

In step 602, the UE (for example a UE in inactive mode) performs at least one of RSRP measurement, RSRQ measurement or SINR measurement based on the received parameters. The UE in inactive mode will not follow the parameters configured in SIB for cell reselection.

In an example, a threshold may be received from a BS. The threshold is a RRC dedicated message or a SIB message. The threshold could be associated to RSRP, RSRQ, or SINR. The UE may apply the CG resources for data transmission in the case that measurement value based on RSRP, RSRQ, or SINR is equal to or larger than its corresponding threshold. In an example, there are two thresholds configured, one threshold for RSRP and one threshold for reference signal receiving quality (RSRQ) value. The UE may apply the CG resources for data transmission in the case that RSRP measurement is equal to or larger than its corresponding threshold and/or the RSRQ value is equal to or larger than its corresponding threshold. Here, the RSRP or RSRQ could be replaced by SINR. In another example, there are three thresholds, one threshold for RSRP, one threshold for RSRQ, one threshold for SINR. The UE may apply the CG resources for data transmission in the case that RSRP measurement is equal to or larger than its corresponding threshold, the RSRQ value is equal to or larger than its corresponding threshold, and the SINR value is equal to or larger than its corresponding threshold. In another example, there are three thresholds, one threshold for RSRP, one threshold for RSRQ, one threshold for SINR. The UE may apply the CG resources for data transmission in the case that RSRP measurement is equal to or larger than its corresponding threshold, the RSRQ value is equal to or larger than its corresponding threshold, or the SINR value is equal to or larger than its corresponding threshold. Here, the measurement of RSRP, RSRQ or SINR could be based on the measurement parameters for cell reselection broadcasted in system information or the measurement parameter for data transmission or small data transmission. The measurement parameter could be the parameters including a threshold of synchronization signal and physical broadcast channel (PBCH) block (SSB) and a number of SSB to be average, and or the a threshold of CSI-RS resource and a number of CSI-RS resource to be averaged for consolidation and selection of channel quality measurement.

In an example, the parameters may be configured in information element (IE) field RSRP changing for TA validation to restrict the RSRP computing. Furthermore, the UE may evaluate RSRP changing based on the RSRP measurement and determine whether TA is invalid based on the evaluated RSRP changing. In another example, the parameters may be configured in a RRC connection release message or suspend message for data transmission over configured grant (CG) resources. And the parameters may be reported to the BS.

The reasons is, in narrow band internet of things (NB-IOT) TA invalid topic, the channel quality changing could be associated with the optional TA invalid factor. If the RSRP changing is over a threshold (UE may be moving), the TA should be invalid and TA updating maybe triggered by the UE, then the BS may update UE's (preconfigured uplink resource) PUR configuration in this procedure. Hence, in NR, the measurement restriction on RSRP changing in TA validation topic could also be used to keep the good channel quality for data transmission (such as small data transmission).

Alternatively, in another embodiment, the parameters including absThreshSS-BlocksConsolidation and nrofSS-BlocksToAverage for RSRP, RSRQ, or SINR measurement may be configured in RRC release message for small data transmission. For UE, it will perform the RSRP, RSRQ, or SINR measurement based on this configuration parameter to obtain the RRC layer RSRP, RSRQ or SINR measurement value if provided, inactive mode UE will not follow the parameters configured in SIB for cell reselection.

The following parameters could be used to specify NR CG configuration with new measurement configuration. New channel state information-reference signal (CSI-RS) measurement configuration maybe optional if beam is applied for data transmission in inactive mode UE. This means that UE in active mode or idle mode for data transmission could perform the measurement based on SSB beam and or CSI-RS beam.

The following illustrates an example of PUR-Config or CG resource information element.

```
  absThreshSSS-BlocksConsolidation          ThresholdNR
OPTIONAL, -- Need R
  absThreshCSI-RS-Consolidation             ThresholdNR
OPTIONAL, -- Need R
  nrofSS-BlocksToAverage                    INTEGER (2..maxNrofSS-BlocksToAverage)
OPTIONAL, -- Need R
  nrofCSI-RS-ResourcesToAverage             INTEGER
(2..maxNrofCSI-RS-ResourcesToAverage)         OPTIONAL, -- Need R
```

In this document, the SIB or system information could include the remaining minimum system information (SI). The SINR could be replaced by signal noise ratio (SNR).

In this document, a UE moves from the first cell to a second cell which is different from the first cell, which means that UE is re-selected to a second cell or camped to a second cell.

In this document, the data transmission or small data transmission may mean that a UE in inactive mode or idle mode could transmit the data to network, or receive the data from the network. The details could be as follows:

An inactive UE may have a CN connection in a cell (e.g., cell A) associated with its last serving BS (also referred to as "anchor BS"). However, in some scenarios, the inactive UE may perform data transmission via another cell (cell B). The data transmission may include at least one of an uplink data transmission and downlink data transmission. For example, the inactive UE may initiate an uplink data transmission via cell B, establish a RAN connection with cell B, enter the connected mode, and then perform the data transmission. Or, the inactive UE may initiate an uplink data transmission via cell B and still stay in inactive mode in the data transmission procedure. An idle UE may act similarly.

After the completion of the data transmission, the inactive or idle UE may receive a suspend message or release message from cell B and then go back to the inactive or idle mode. Or, after the completion of the data transmission, the inactive or idle UE may receive a suspend message or release message from cell B and the UE still stay in inactive or idle mode in the data transmission procedure. In some embodiments of the present disclosure, the suspend message or release message is an RRC message. In some embodiments of the present disclosure, the data size in such data transmission may be no larger than the maximum transport block (TB) size that can be applied in one transmission, as defined in standard protocols. Small data transmission is one of such scenarios.

The embodiments of the present application can make the old cell of the UE release the CG resources more efficiently and keep the good channel quality for a UE in inactive mode with small data transmission.

Figure 7:
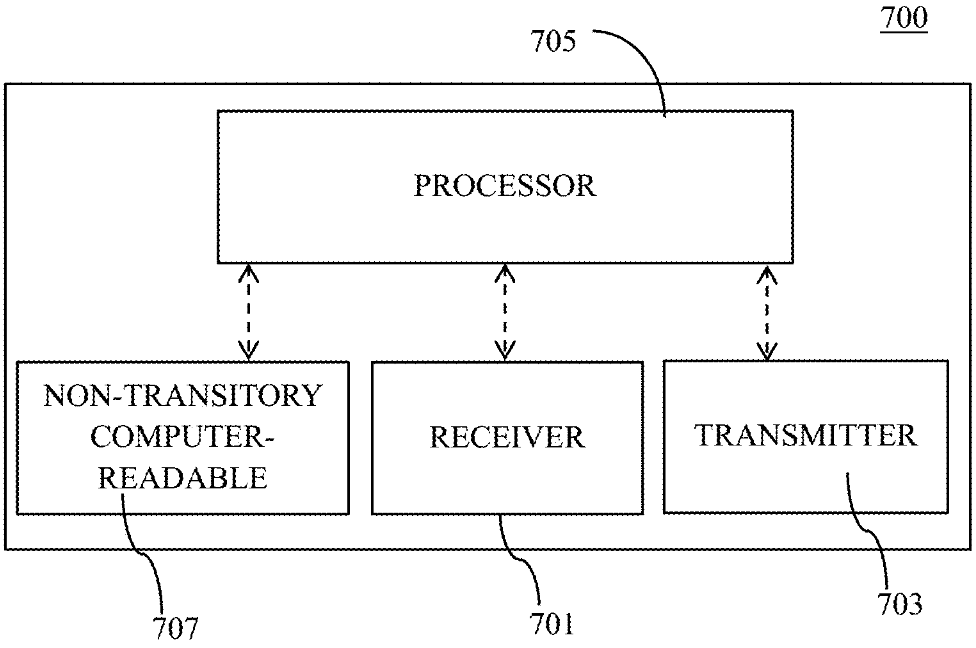
FIG. 7 illustrates an apparatus according to some embodiments of the present application.

FIG. 7 illustrates an apparatus according to some embodiments of the present application. In some embodiments of the present disclosure, the apparatus 1000 may be the UE 101 as illustrated in FIG. 1, the UE 201 as illustrated in FIG. 2 or other embodiments of the present application.

As shown in FIG. 7, the apparatus 700 may include a receiver 701, a transmitter 703, a processer 705, and a non-transitory computer-readable medium 707. The non-transitory computer-readable medium 707 has computer executable instructions stored therein. The processer 705 is configured to be coupled to the non-transitory computer readable medium 707, the receiver 701, and the transmitter 703. It is contemplated that the apparatus 700 may include more computer-readable mediums, receiver, transmitter and processors in some other embodiments of the present application according to practical requirements. In some embodiments of the present application, the receiver 701 and the transmitter 703 are integrated into a single device, such as a transceiver. In certain embodiments, the apparatus 700 may further include an input device, a memory, and/or other components.

In some embodiments of the present application, the non-transitory computer-readable medium 707 may have stored thereon computer-executable instructions to cause a processor to implement the method according to embodiments of the present application.

Figure 8:
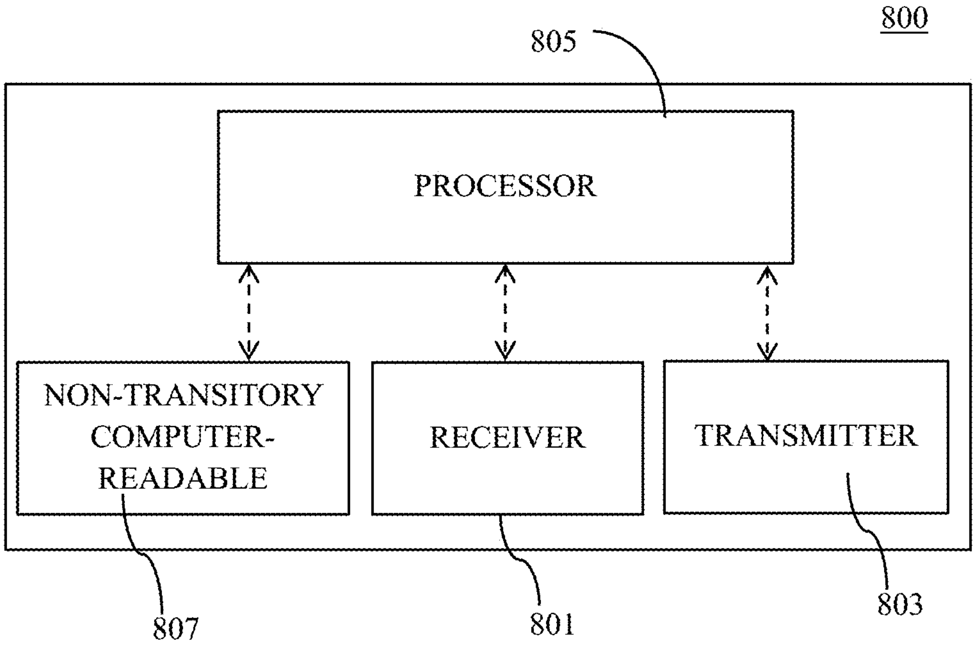
FIG. 8 illustrates another apparatus according to some other embodiments of the present application.

FIG. 8 illustrates another apparatus according to some embodiments of the present application. In some embodiments of the present disclosure, the apparatus 800 may be the BS 102 as illustrated in FIG. 1, the BS 202 as illustrated in FIG. 2 or other embodiments of the present application.

As shown in FIG. 8, the apparatus 800 may include a receiver 801, a transmitter 803, a processer 805, and a non-transitory computer-readable medium 807. The non-transitory computer-readable medium 807 has computer executable instructions stored therein. The processer 805 is configured to be coupled to the non-transitory computer readable medium 807, the receiver 801, and the transmitter 803. It is contemplated that the apparatus 800 may include more computer-readable mediums, receiver, transmitter and processors in some other embodiments of the present application according to practical requirements. In some embodiments of the present application, the receiver 801 and the transmitter 803 are integrated into a single device, such as a transceiver. In certain embodiments, the apparatus 800 may further include an input device, a memory, and/or other components.

In some embodiments of the present application, the non-transitory computer-readable medium 807 may have stored thereon computer-executable instructions to cause a processor to implement the method according to embodiments of the present application.

Persons skilled in the art should understand that as the technology develops and advances, the terminologies described in the present application may change, and should not affect or limit the principle and spirit of the present application.

Those having ordinary skill in the art would understand that the steps of a method described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. Additionally, in some aspects, the steps of a method may reside as one or any combination or set of codes and/or instructions on a non-transitory computer-readable medium, which may be incorporated into a computer program product.

While this disclosure has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, embodiments of the disclosure as set forth herein are intended to be illustrative, not limiting. Various changes may be made without departing from the spirit and scope of the disclosure.

In this document, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

What is claimed is:

1. An apparatus for wireless communication, comprising:
at least one memory; and
at least one processor coupled with the at least one memory and configured to cause the apparatus to:
determine whether configured grant (CG) resources in a first cell need to be released;
receive indication information that indicates whether the apparatus is enabled to transmit a CG resource releasing report; and
in response to determining that the CG resources need to be released, transmit the CG resource releasing report or release the CG resources.

2. The apparatus of claim 1, wherein the at least one processor is further configured to cause the apparatus to:
determine whether a condition for triggering to transmit the CG resource releasing report is fulfilled; and
in response to determining that the condition is fulfilled, transmit the CG resource releasing report,
wherein the condition comprises:
m is less than or equal to a first value X if a user equipment (UE) is camped to a second cell that is different from the first cell;
M−m is larger than or equal to a second value Y if a UE is camped to a second cell that is different from the first cell;
time elapsed since a current time point until releasing the CG resources by a base station (BS) is larger than a third value Z; and
when a timer expired, wherein the timer starts after a UE is camped in a second cell that is different from the first cell, or
wherein m is a number of consecutive uplink transmissions that are not performed on the CG resources in the first cell, M is a maximum number of consecutive uplink transmissions that are not performed on the CG resources for determining to release the CG resources by the BS, and X, Y and Z are integers.

3. The apparatus of claim 1, wherein the indication information is received via a radio resource control (RRC) message, media access control (MAC) control element (CE), or a system information block (SIB) message.

4. The apparatus of claim 1, wherein the indication information indicates to enable or disable CG resource releasing associated with a specific CG index, a specific band width part (BWP), a specific cell, or a specific UE.

5. The apparatus of claim 1, wherein, for a UE in an inactive mode, when the UE moves from the first cell to a second cell different from the first cell, the CG resource releasing report comprises:
ID information of the UE; or
the CG resource information in the first cell.

6. The apparatus of claim 1, wherein, for a UE in an inactive mode, when the UE moves from the first cell to a second cell different from the first cell, the CG resource releasing report comprises ID information of the UE, the CG resource in a first cell releasing indication, or the CG resource information in the first cell is transmitted when the UE is in a connected mode.

7. The apparatus of claim 1, wherein, for a UE in an idle mode, when the UE moves from the first cell to a second cell different from the first cell, the CG resource releasing report comprises:

ID information of the UE in the first cell and ID information of the first cell; or the CG resource information in the first cell.

8. The apparatus of claim 1, wherein, for a UE in an idle mode, when the UE moves from the first cell to a second cell different from the first cell, the CG resource releasing report comprises ID information of the UE, ID information of the first cell, the CG resource in the first cell releasing indication, or CG resource information in the first cell is transmitted when the UE is in connected mode.

9. An apparatus for wireless communication, comprising:

at least one memory; and at least one processor coupled with the at least one memory and configured to cause the apparatus to:

transmit information to a user equipment (UE), wherein the information is used for determining whether configured grant (CG) resources in a first cell need to be released, wherein the information comprises a condition for triggering the UE to transmit a CG resource releasing report; and release the CG resources in the first cell.

10. The apparatus of claim 9, wherein the condition comprises:

m is less than or equal to a first value X if a UE is camped to a second cell that is different from the first cell;

M−m is larger than or equal to a second value Y if a UE is camped to a second cell that is different from the first cell;

time elapsed since a current time point until releasing the CG resources by a base station (BS) is larger than a third value Z; and when a timer expired, wherein the timer starts after a UE is camped in a second cell that is different from the first cell, wherein m is a number of consecutive uplink transmissions which are not performed on the CG resources in the first cell, M is a maximum number of consecutive uplink transmissions which are not performed on the CG resources for determining to release the CG resources by the BS, and X, Y and Z are integers.

11. The apparatus of claim 9, wherein the at least one memory is further configured to cause the apparatus to:

transmit indication information for indicating whether the UE is enabled to transmit the CG resource releasing report.

12. The apparatus of claim 11, wherein the indication information is transmitted via a radio resource control (RRC) message, media access control (MAC) control element (CE) or a system information block (SIB) message.

13. The apparatus of claim 11, wherein the indication information indicates to enable or disable CG resource releasing associated with specific CG index, specific band width part (BWP), specific cell, or specific UE.

14. The apparatus of claim 9, wherein, for the UE in an inactive mode, when the UE moves from the first cell to a second cell that is different from the first cell, the at least one processor is further configured to cause the apparatus to receive from a base station (BS) covering the second cell:

ID information of the UE; or the CG resource information in the first cell.

15. The apparatus of claim 9, wherein, for the UE in an idle mode, when the UE moves from the first cell to a second cell that is different from the first cell, the at least one processor is further configured to cause the apparatus to receive from a base station (BS) covering the second cell:

ID information of the UE in the first cell and ID information of the first cell; or the CG resource information in the first cell.

16. The apparatus of claim 9, wherein the at least one memory is further configured to cause the apparatus to receive a CG resource releasing report from the UE.

17. The apparatus of claim 16, wherein the CG resource releasing report comprises the CG resource information in the first cell for data transmission for a UE in an idle mode or in an inactive mode.

18. A method performed by a user equipment (UE), the method comprising:

determining whether configured grant (CG) resources in a first cell are to be released;

receiving indication information that indicates whether the UE is enabled to transmit a CG resource releasing report; and in response to determining that the CG resources are to be released, transmit the CG resource releasing report or release the CG resources.

19. The method of claim 18, wherein the indication information is received via a radio resource control (RRC) message, media access control (MAC) control element (CE), or a system information block (SIB) message; and wherein the indication information indicates to enable or disable CG resource releasing associated with a specific CG index, a specific band width part (BWP), a specific cell, or a specific UE.

* * * * *